US010318829B2

(12) United States Patent
Miyamoto

(10) Patent No.: US 10,318,829 B2
(45) Date of Patent: Jun. 11, 2019

(54) PASSENGER COUNTING DEVICE, SYSTEM, METHOD AND PROGRAM, AND VEHICLE MOVEMENT AMOUNT CALCULATION DEVICE, METHOD AND PROGRAM

(71) Applicant: NEC CORPORATION, Tokyo (JP)

(72) Inventor: Shinichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/572,826

(22) PCT Filed: Mar. 17, 2016

(86) PCT No.: PCT/JP2016/001548
§ 371 (c)(1),
(2) Date: Nov. 9, 2017

(87) PCT Pub. No.: WO2017/158647
PCT Pub. Date: Sep. 21, 2017

(65) Prior Publication Data
US 2018/0144204 A1    May 24, 2018

(51) Int. Cl.
*G06K 9/00* (2006.01)
*G06T 7/50* (2017.01)
(Continued)

(52) U.S. Cl.
CPC ..... *G06K 9/00838* (2013.01); *G06K 9/00362* (2013.01); *G06K 9/00785* (2013.01);
(Continued)

(58) Field of Classification Search
CPC ........... G06K 9/00838; G06K 9/00362; G06K 9/00228; G06K 9/00832; G06T 7/50; G06T 1/00; G06T 7/60; G06T 2207/30242
See application file for complete search history.

(56) References Cited

U.S. PATENT DOCUMENTS

| 2013/0336538 A1* | 12/2013 | Skaff | G06K 9/00785 382/104 |
| 2015/0062340 A1* | 3/2015 | Datta | G06K 9/00838 348/148 |

(Continued)

FOREIGN PATENT DOCUMENTS

| CN | 104268506 A | 1/2015 |
| JP | 2010-067090 A | 3/2010 |

(Continued)

OTHER PUBLICATIONS

Hao et al. "An Automatic Vehicle Occupant Counting Algorithm Based on Face Detection." 8th International Conference on Signal Processing, Nov. 16, 2006, 4 pages (Year: 2006).*

(Continued)

*Primary Examiner* — Jon Chang
(74) *Attorney, Agent, or Firm* — Sughrue Mion, PLLC

(57) ABSTRACT

The passenger counting system includes a photographing means 20 for photographing a vehicle and acquiring an image, and a passenger counting device 200. A passenger counting device 200 includes: a movement amount calculation means 21 for calculating a movement amount of a vehicle based on an image of the vehicle; a depth distance calculation means 22 for calculating a distance in a depth direction of a face of a passenger of the vehicle based on the movement amount of the vehicle; and a passenger number determination means 23 for detecting the face of the passenger of the vehicle from the image and determining the number of passengers of the vehicle based on distances in the depth direction of a plurality of detected faces of passengers.

20 Claims, 9 Drawing Sheets

(51) Int. Cl.
*G06T 1/00* (2006.01)
*G06T 7/60* (2017.01)
(52) U.S. Cl.
CPC .............. *G06T 1/00* (2013.01); *G06T 7/50* (2017.01); *G06T 7/60* (2013.01); *G06K 9/00228* (2013.01); *G06K 9/00832* (2013.01); *G06T 2207/30242* (2013.01)

(56) References Cited

U.S. PATENT DOCUMENTS

| | | | | |
|---|---|---|---|---|
| 2015/0278617 | A1* | 10/2015 | Oami | G06T 1/60 382/103 |
| 2015/0294144 | A1* | 10/2015 | Konishi | H04N 7/188 382/103 |
| 2016/0239714 | A1* | 8/2016 | Oami | G06K 9/00832 |

FOREIGN PATENT DOCUMENTS

| | | |
|---|---|---|
| JP | 2011-243188 A | 12/2011 |
| JP | 2015-070359 A | 4/2015 |
| JP | 2016-021091 A | 2/2016 |
| WO | 2014/061195 A1 | 4/2014 |
| WO | 2014/064898 A1 | 5/2014 |
| WO | 2015/052896 A1 | 4/2015 |

OTHER PUBLICATIONS

Pavlidis et al. "A Vehicle Occupant Counting System Based on Near-Infrared Phenomenology and Fuzzy Neural Classification." IEEE Transactions on Intelligent Transportation Systems, vol. 1, No. 2, Jun. 2000, pp. 72-85 (Year: 2000).*

Hao et al. "A Near-infrared Imaging Method for Capturing the Interior of a Vehicle Through a Windshield." IEEE Southwest Symposium on Image Analysis & Interpretation, May 23, 2010, pp. 109-112 (Year: 2010).*

International Search Report for PCT/JP2016/001548, dated May 17, 2016.

Communication dated Mar. 13, 2019, from the Australian Patent Office in counterpart application No. 2016397317.

* cited by examiner

PASSENGER COUNTING DEVICE, SYSTEM, METHOD AND PROGRAM, AND VEHICLE MOVEMENT AMOUNT CALCULATION DEVICE, METHOD AND PROGRAM

CROSS REFERENCE TO RELATED APPLICATIONS

This application is a National Stage of International Application No. PCT/JP2016/001548 filed Mar. 17, 2016, the contents of all of which are incorporated herein by reference in their entirety.

Technical Field

The present invention relates to passenger counting device, system, method, and program to count the number of passengers of a vehicle, and vehicle movement amount calculation device, method, and program.

Background Art

In recent years, a high occupancy vehicle (HOV) system, which discounts tolls depending on the number of passengers of a vehicle or permits passage of a road only to a vehicle with the passenger number exceeding a predetermined number, has been used. In the HOV system, a technique is used in which the passenger number is counted by photographing a vehicle using an installed camera and performing face detection on the photographed image.

PTLs 1 to 3 are disclosed as a system for counting the number of passengers of a vehicle by face detection. PTL 1 discloses a technique of counting the number of passengers of a vehicle by detecting a profile of a person. PTL 2 discloses a technique of measuring the passenger number by detecting persons and estimating at which positions in a vehicle the persons are on board. PTL 3 discloses a technique of counting the passenger number using a movement amount of a vehicle and a person detection result.

CITATION LIST

Patent Literature

PTL 1: International Publication No. 2014/061195
PTL 2: International Publication No. 2014/064898
PTL 3: International Publication No. 2015/052896

SUMMARY OF INVENTION

Technical Problem

In the systems disclosed in PTLs 1 to 3, there is a possibility of erroneous detection when face detection is performed. For example, the above-described systems sometimes erroneously detect a plurality of persons at a close distance on an image as one person.

Accordingly, an object of the present invention is to provide passenger counting device, system, method and program, and vehicle movement amount calculation device, method, and program capable of improving accuracy in counting of the number of passengers of a vehicle.

Solution to Problem

A passenger counting device according to the present invention is characterized by including: a movement amount calculation means for calculating a movement amount of a vehicle based on an image of the vehicle; a depth distance calculation means for calculating a distance in a depth direction of a face of a passenger of the vehicle based on the movement amount of the vehicle; and a passenger number determination means for detecting the face of the passenger of the vehicle from the image and determining the number of passengers of the vehicle based on distances in the depth direction of a plurality of detected faces of the passengers.

A passenger counting system according to the present invention is characterized by including: a photographing means for capturing a vehicle and acquiring an image; a movement amount calculation means for calculating a movement amount of the vehicle based on the image of the vehicle; a depth distance calculation means for calculating a distance in a depth direction of a face of a passenger of the vehicle based on the movement amount of the vehicle; and a passenger number determination means for detecting the face of the passenger of the vehicle from the image and determining the number of passengers of the vehicle based on distances in the depth direction of a plurality of detected faces of the passengers.

A passenger counting method according to the present invention, the method is characterized by calculating a movement amount of a vehicle based on an image of the vehicle; calculating a distance in a depth direction of a face of a passenger of the vehicle based on the movement amount of the vehicle, and detecting the face of the passenger of the vehicle from the image and determining the number of passengers of the vehicle based on distances in the depth direction of a plurality of detected faces of the passengers.

A passenger counting program according to the present invention is characterized by causing a computer to execute: a movement amount calculation process of calculating a movement amount of a vehicle based on an image of the vehicle; a depth distance calculation process of calculating a distance in a depth direction of a face of a passenger of the vehicle based on the movement amount of the vehicle; and a passenger number determination process of detecting the face of the passenger of the vehicle from the image and determining the number of passengers of the vehicle based on distances in the depth direction of a plurality of detected faces of the passengers.

A vehicle movement amount calculation device according to the present invention is characterized by calculating a movement amount of a vehicle based on an image of the vehicle and estimating an error of the movement amount of the vehicle using a steepest descent method.

A vehicle movement amount calculation method according to the present invention is characterized by calculating a movement amount of a vehicle based on an image of the vehicle and estimating an error of the movement amount of the vehicle using a steepest descent method.

A vehicle movement amount calculation program according to the present invention is characterized by causing a computer to execute: a process of calculating a movement amount of a vehicle based on an image of the vehicle and estimating an error of the movement amount of the vehicle using a steepest descent method.

Advantageous Effects of Invention

According to the present invention, it is possible to improve the accuracy in counting of the number of passengers of the vehicle.

DETAILED DESCRIPTION

First Exemplary Embodiment

Figure 1:
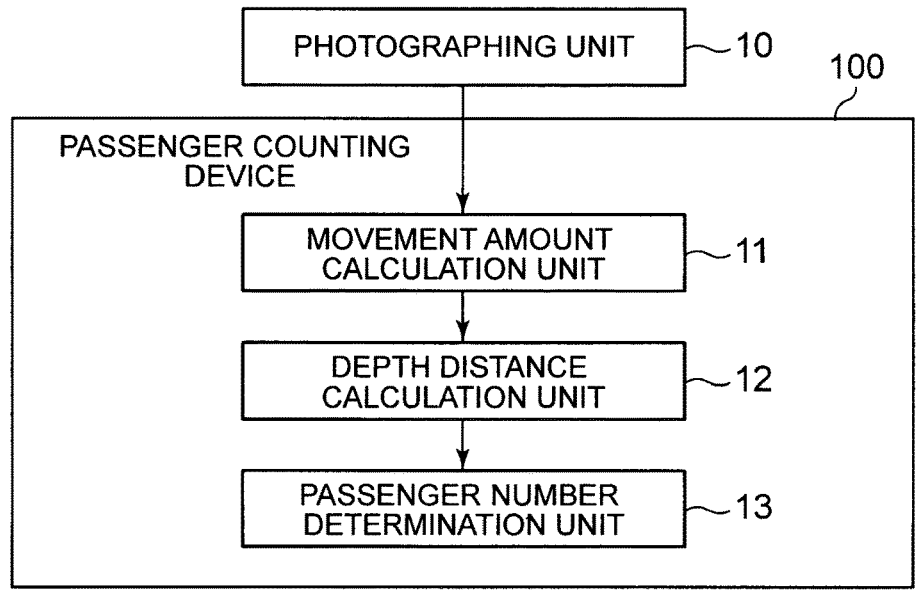
FIG. 1 It depicts a block diagram illustrating a configuration of a first exemplary embodiment of a passenger counting system according to the present invention.

A passenger counting system according to the present exemplary embodiment will be described with reference to the drawings. FIG. 1 is a block diagram illustrating a configuration of the passenger counting system according to the present exemplary embodiment. The passenger counting system includes a photographing unit 10 and a passenger counting device 100. In addition, the passenger counting device 100 includes a movement amount calculation unit 11, a depth distance calculation unit 12, and a passenger number determination unit 13.

The photographing unit 10 photographs a vehicle and acquires an image. In the present exemplary embodiment, the photographing unit 10 is a general camera, and photographs a subject to generate a digital image. In addition, the photographing unit 10 is installed on a road side, and performs photographing from a lateral direction of the vehicle (a direction substantially perpendicular to a traveling direction) in the present exemplary embodiment. The photographing unit 10 may employ a charge-coupled device (CCD) camera, a complementary metal-oxide-semiconductor (CMOS) camera, an infrared camera, or the like.

The movement amount calculation unit 11 calculates the movement amount of the vehicle based on the image of the vehicle acquired by the photographing unit 10. Specifically, the movement amount calculation unit 11 estimates the movement amount of the vehicle based on the movement amount of a specific part of the vehicle such as a handle portion of a door.

The depth distance calculation unit 12 calculates a distance (depth distance) in a depth direction of a face of a passenger of the vehicle in real space based on the movement amount of the vehicle calculated by the movement amount calculation unit 11. Specifically, the depth distance calculation unit 12 calculates the distance in the depth direction from the photographing unit 10 to the face of the passenger based on the calculated movement amount of the vehicle and a direction toward the face of the passenger of the vehicle from a position of the photographing unit 10 that has photographed the vehicle.

The passenger number determination unit 13 detects the face of the passenger of the vehicle from the image of the vehicle acquired by the photographing unit 10, determines presence or absence of erroneous detection based on a distance in the depth direction between a plurality of detected faces of passengers, and determines the number of passengers of the vehicle. For example, when the distance in the depth direction between the plurality of detected faces of passengers is equal to or longer than a first threshold value or when a distance in the traveling direction between the plurality of faces of passengers is equal to or longer than a second threshold value, the passenger number determination unit 13 determines that the plurality of faces of passengers are faces of different persons. The passenger number determination unit 13 may use a distance between partial images from which the face is detected as the distance between the faces.

Figure 2:
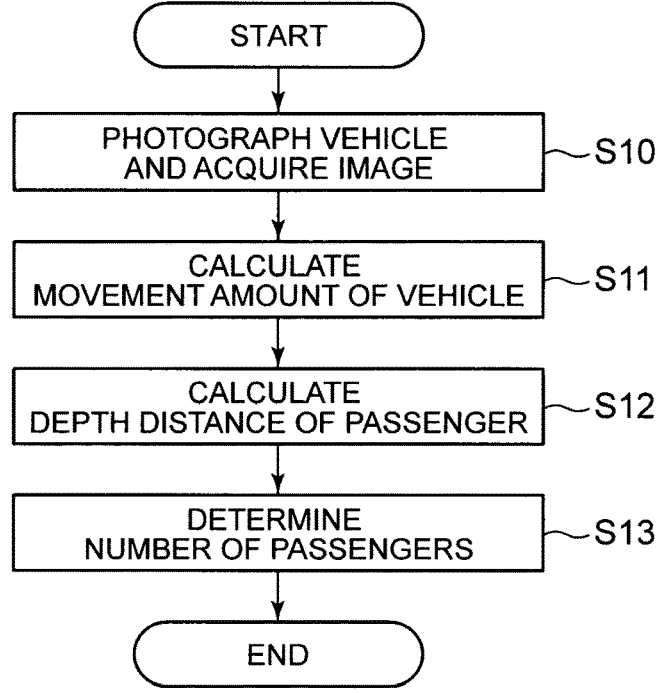
FIG. 2 It depicts a flowchart illustrating an operation of the first exemplary embodiment of the passenger counting system according to the present invention.

Next, an operation of the passenger counting system according to the present exemplary embodiment will be described. FIG. 2 is a flowchart illustrating the operation of the passenger counting system according to the present exemplary embodiment.

The photographing unit 10 photographs a moving vehicle at a plurality of timings and acquires images (step S10). In the present exemplary embodiment, the photographing unit 10 is a general camera, and photographs a subject to generate a digital image. In addition, the photographing unit 10 is installed on the road side, and performs photographing from the lateral direction of the vehicle (the direction substantially perpendicular to the traveling direction of the vehicle) in the present exemplary embodiment. In order to acquire vehicle images at the plurality of timings, the photographing unit 10 may photograph the vehicle in accordance with an externally given trigger, or the vehicle may be continuously photographed at predetermined intervals set in advance. For example, when a laser-type vehicle detection sensor is used to detect a vehicle, the photographing unit 10 may be configured to determine a timing to start photographing. In addition, it is also possible to configure the system such that the speed of the vehicle is detected by a speed detector of the vehicle, and the photographing unit 10 changes a photographing cycle, which is a timing for photographing, according to the speed of the vehicle. Here, the photographing timing may be any one of a timing to start photographing, a timing to terminate photographing, and a photographing interval (periodic interval or the like).

The photographing unit 10 may include an infrared projector in order to clearly photograph the person in the vehicle. In this case, the photographing unit 10 is capable of photographing light in the infrared range. Incidentally, the photographing unit 10 may photograph the vehicle so as to transmit only a wavelength in the infrared range using a band-pass filter in order to reduce the influence of visible light. In addition, the photographing unit 10 may include a polarizing filter in order to suppress reflection of light on a glass surface. The photographing unit 10 can mitigate the influence of environment information reflected on the glass surface of the vehicle on detection by utilizing polarization characteristics of reflected light using the polarizing filter.

The movement amount calculation unit 11 calculates the movement amount of the vehicle based on the image of the moving vehicle (step S11). The movement amount calculation unit 11 first detects the specific part of the vehicle such as the door handle portion (a door knob or a door outer handle) from the image acquired by the photographing unit 10, and acquires information such as a coordinate value indicating a position of the detected specific part. The specific part of the vehicle may be any portion, such as a tire, a window frame, a vehicle door, a tail lamp, a door mirror, and a side mirror, other than the door handle portion as long as the portion has a characteristic as the specific part of the vehicle. For example, the movement amount calculation unit 11 may detect a license plate, a light, or the like from the image acquired by the photographing unit 10. However, it is preferable to use a characteristic part which is close to the human face on the image and easy to detect such as the door handle portion. The movement amount calculation unit 11 generates positional information of the detected specific part and information accompanying the positional information (for example, information indicating whether a tire is a front tire or a rear tire in the case of the tire) as a specific part detection result.

The movement amount calculation unit 11 associates the specific part detection results with each other between the images and calculates the movement amount of the vehicle in the image. The movement amount calculation unit 11 may perform such association for each of two consecutive images or collectively for a plurality of images.

When performing the association between two consecutive images, the movement amount calculation unit 11 considers the traveling direction of the vehicle. For example, the movement amount calculation unit 11 searches whether or not the specific part is detected in an image in the traveling direction from a position where the specific part has been detected in the previous image based on the specific part detection result. In this manner, the movement amount calculation unit 11 obtains the specific part that is associated between the latest image and the previous image.

An angle of view of the photographing unit 10 (camera) is fixed in the present exemplary embodiment. Thus, the movement amount calculation unit 11 can predict a direction (trajectory) in which the specific part moves in the image. Accordingly, the movement amount calculation unit 11 searches whether or not a detection result of the specific part is present in the direction in the next image, and performs the association. The moving direction of the specific part at each position of the image may be manually given. Alternatively, the movement amount calculation unit 11 may perform the association between the images based on images obtained by photographing the vehicle subjected to test run at low speed, and acquire the moving direction of the specific part at each position of the image. The movement amount calculation unit 11 can use various methods, such as template matching for each partial region and a method of calculating local characteristic quantities, such as a scale-invariant feature transform (SIFT) characteristic, and associating the characteristic quantities with each other, as the method of association between the images.

Figure 3:
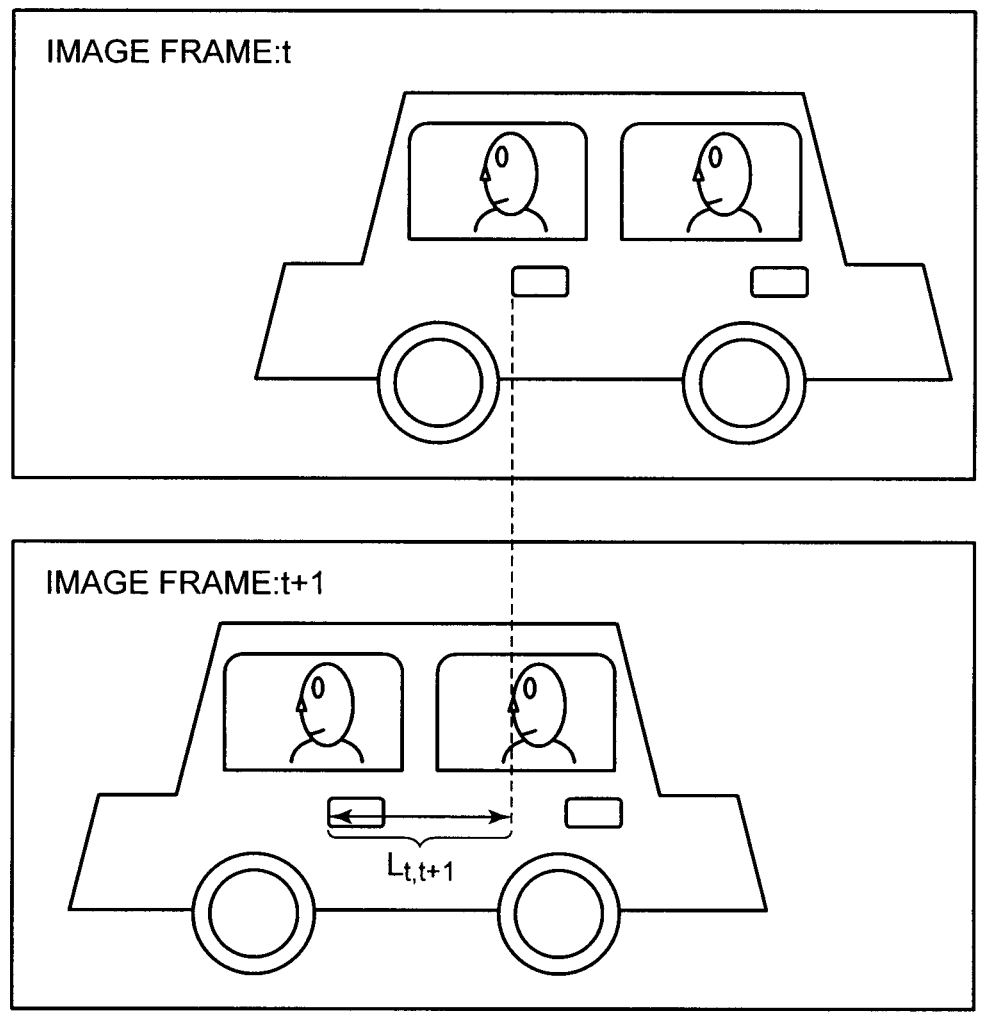
FIG. 3 It depicts an explanatory diagram illustrating calculation of an estimated movement amount performed by a movement amount calculation unit.

FIG. 3 is an explanatory diagram illustrating calculation of an estimated movement amount performed by the movement amount calculation unit 11. In the example illustrated in FIG. 3, the movement amount calculation unit 11 uses the door handle portion as the specific part. FIG. 3 illustrates an image frame t at time t and an image frame t+1 at time t+1. Then, the movement amount calculation unit 11 sets a distance of the door handle portion between the time t and the time t+1 to a movement amount $l_{t,\ t+1}$ of the vehicle.

The depth distance calculation unit 12 calculates the depth distance of the face of the passenger of the vehicle based on the movement amount of the vehicle calculated by the movement amount calculation unit 11 (step S12). In order to calculate the depth, the depth distance calculation unit 12 measures a direction of a face of a target person relative to the camera (photographing unit 10). The depth distance calculation unit 12 uses, for example, a pinhole camera model in order to measure the direction.

Figure 4:
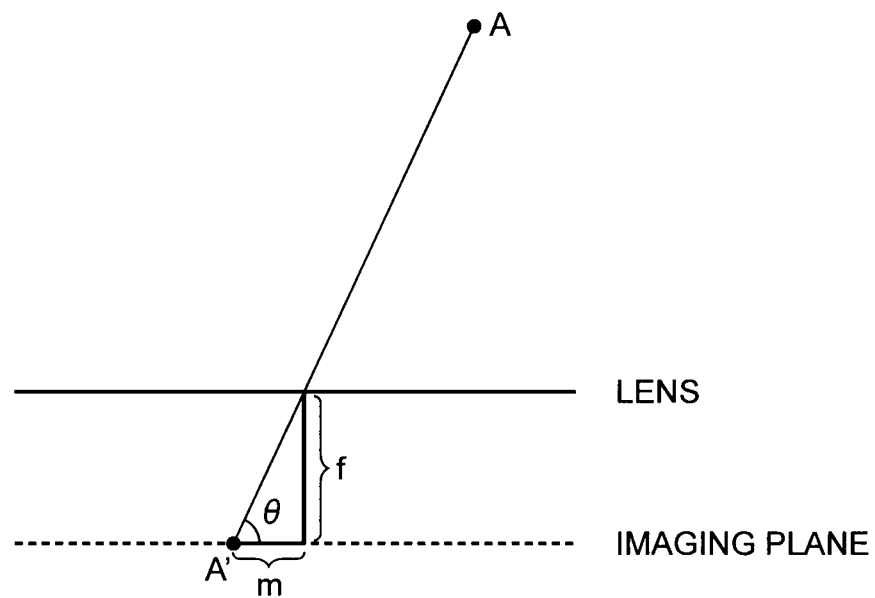
FIG. 4 It depicts an explanatory diagram illustrating a pinhole camera model.

FIG. 4 is an explanatory diagram illustrating the pinhole camera model. A distance from an imaging plane to a lens in a case where the camera photographs a photographing target A is denoted by f (focal length). In addition, when a distance from a center of the imaging plane (a position facing a lens center) to A' where the photographing target A is projected is denoted by m, tan θ=f/m. That is, the depth distance calculation unit 12 can calculate θ based on m and f.

Figure 5:
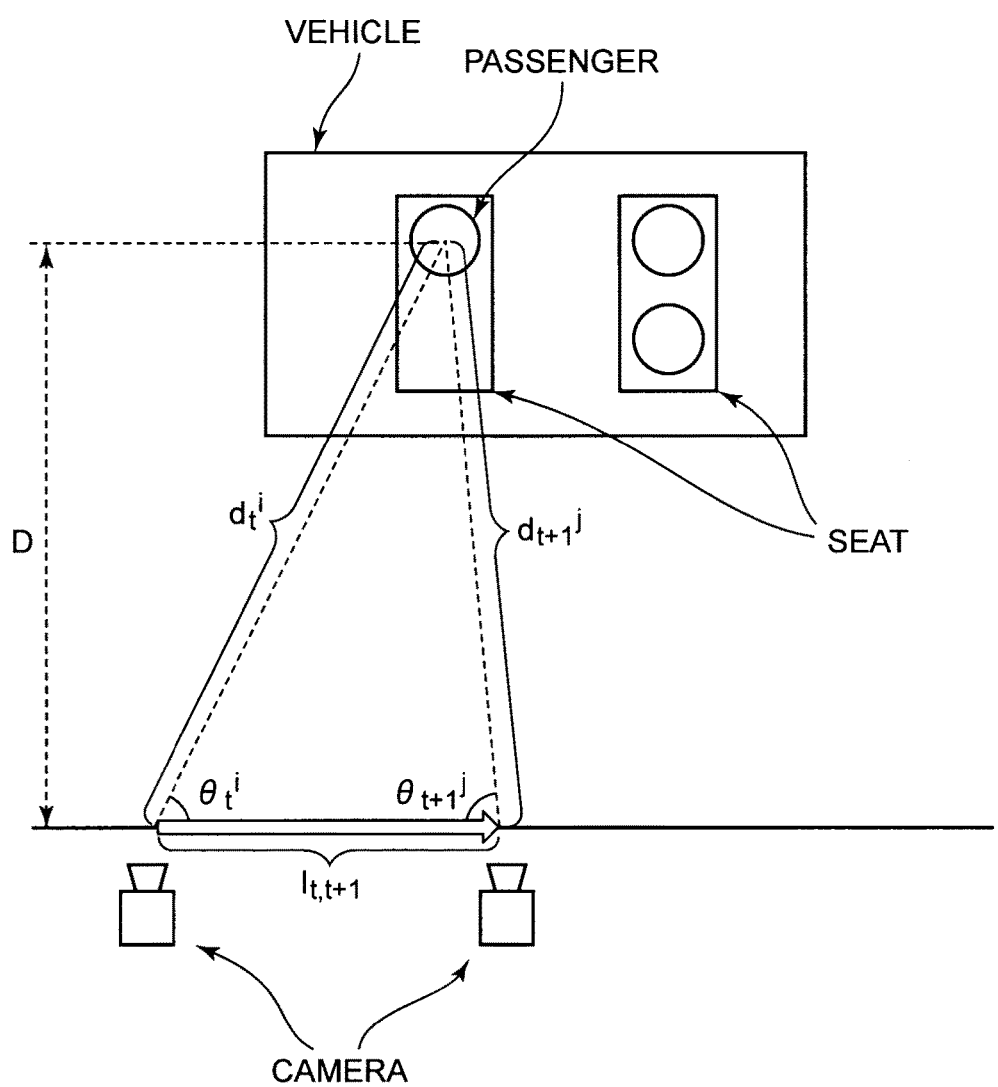
FIG. 5 It depicts an explanatory diagram illustrating a method of calculating a depth distance from the camera to a target face.

FIG. 5 is an explanatory diagram illustrating a method of calculating a depth distance from a camera to a target face. In the example illustrated in FIG. 5, seats are installed at the front part and the rear part inside the vehicle, and a plurality of persons are on board. FIG. 5 illustrates the method of calculating the distance from the camera to the target face using the principle of triangulation when it is assumed that not the vehicle but the camera moves. As illustrated in FIG. 5, a distance from the camera to the target face at time t is denoted by $d_t^i$, and a direction is denoted by $\theta_t^i$. A distance from the camera to the target face at time t+1 is denoted by $d_{t+1}^j$, and a direction is denoted by $\theta_{t+1}^j$. Then, when a vehicle movement amount from time t to time t+1 is denoted by $l_{t,\ t+1}$, Formula (1) is established according to the sine theorem.

[Formula 1]

$$\frac{d_{t+1}^j}{\sin\theta_t^i} = \frac{d_t^i}{\sin\theta_{t+1}^j} = \frac{l_{t,t+1}}{\sin(\pi - \theta_t^i - \theta_{t+1}^j)} \tag{1}$$

The depth distance calculation unit 12 can calculate $d_t^i$ and $d_{t+1}^j$ by substituting a value calculated by the movement amount calculation unit 11 for the vehicle movement amount $l_{t,\ t+1}$ of Formula (1) and calculating $\theta_t^i$ and $\theta_{t+1}^j$ using the method illustrated in FIG. 4. A depth distance D illustrated in FIG. 5 is a distance from the camera to the target face in the direction perpendicular to the traveling direction of the vehicle. The depth distance calculation unit 12 can calculate the depth distance D as illustrated in Formula (2). The depth distance calculation unit 12 outputs this distance D to the passenger number determination unit 13.

[Formula 2]

$$D = d_{t+1}^j \sin\theta_{t+1}^j = d_t^i \sin\theta_t^i \tag{2}$$

The passenger number determination unit 13 acquires the face of the passenger detected from the image, and determines the presence or absence of erroneous detection based on the distance in the depth direction of a plurality of detected faces of passengers, and determines the number of passengers of the vehicle (step S13). The passenger number determination unit 13 first performs a face detection process on the image acquired by the photographing unit 10. The passenger number determination unit 13 obtains a portion, which is estimated to include a face of a person by the face detection process, as a partial image. At this time, there is a case where the passenger number determination unit 13 erroneously detects a portion that is not the face of the person as the face of the person or acquires two partial images from the same person.

Thus, when a depth distance between the partial images is equal to or longer than a predetermined threshold value, the passenger number determination unit 13 determines that the faces included in the respective partial images are different persons. In addition, when the depth distance between the partial images is shorter than the predetermined threshold value, the passenger number determination unit 13 determines that any of the partial images is erroneously detected.

The passenger number determination unit 13 may determine whether or not the faces included in the respective partial images are different persons, respectively, using not only the depth distance between the partial images but also the distance in the traveling direction of the vehicle (traveling direction distance). That is, when the depth distance between the partial images is equal to or longer than the predetermined threshold value (first threshold value), or when the traveling direction distance between the partial images is equal to or longer than a predetermined threshold value (second threshold value), the passenger number determination unit 13 determines that the faces included in the respective partial images are different persons. In addition, when the depth distance between the partial images is shorter than the first threshold value and the traveling direction distance between the partial images is shorter than the second threshold value, the passenger number determination unit 13 determines that any of the partial images is obtained by erroneous detection. The first threshold value used for the depth distance and the second threshold value used for the traveling direction distance may be the same value or different values.

The passenger number determination unit 13 determines the number of partial images, determined to include the face of the person, as the number of passengers except for the partial images determined to be erroneously detected by the above-described process.

Figure 6:
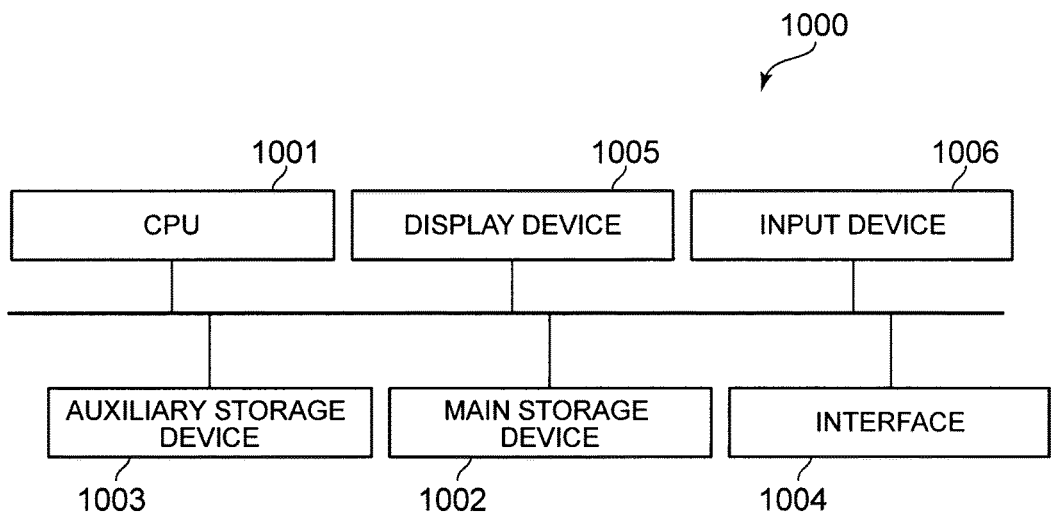
FIG. 6 It depicts a schematic block diagram illustrating a configuration example of a computer according to the present exemplary embodiment.

FIG. 6 is a schematic block diagram illustrating a configuration example of a computer according to the present exemplary embodiment. A computer 1000 includes a CPU 1001, a main storage device 1002, an auxiliary storage device 1003, an interface 1004, a display device 1005, and an input device 1006.

The passenger counting device 100 according to the present exemplary embodiment is mounted on the computer 1000. The passenger counting device 100 is stored in the auxiliary storage device 1003 in the form of a program. The CPU 1001 reads out the program from the auxiliary storage device 1003 and expands the program into the main storage device 1002 to execute the above-described processes according to the program.

The auxiliary storage device 1003 is an example of a non-transitory tangible medium. Other examples of the non-transitory tangible medium may include a magnetic disk, a magneto-optical disk, a CD-ROM, a DVD-ROM, a semiconductor memory, and the like which are connected via the interface 1004. In addition, when the program is distributed to the computer 1000 via a communication line, the computer 1000 may expand the program into the main storage device 1002 and execute the above-described processes in response to the distribution.

In addition, the program may be configured to implement some of the above-described processes. Further, the program may be a differential program which implements the above-described processes in combination with other programs that have been already stored in the auxiliary storage device 1003. A processor included in the computer 1000 is not limited to the CPU 1001, and it may be enough to provide a processor capable of executing a program. In addition, the computer 1000 includes a circuit.

As described above, the passenger counting system according to the present exemplary embodiment determines the number of passengers of the vehicle using the depth information on the passenger, and thus, can accurately count the number of passengers of the vehicle.

Second Exemplary Embodiment

Figure 7:
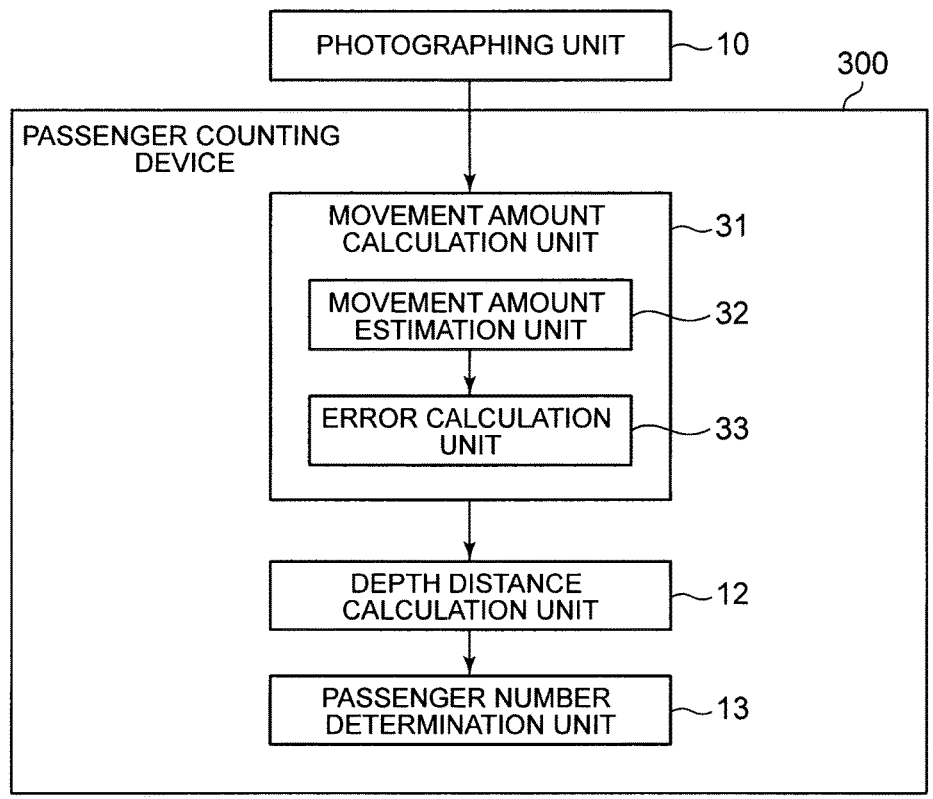
FIG. 7 It depicts a block diagram illustrating a configuration of a second exemplary embodiment of the passenger counting system according to the present invention.

A passenger counting system according to the present exemplary embodiment will be described with reference to the drawings. A configuration of the passenger counting system according to the present exemplary embodiment is the same as the passenger counting system according to the first exemplary embodiment except for the configuration of the movement amount calculation unit 31, and detailed descriptions other than the movement amount calculation unit 31 will be omitted. FIG. 7 is a block diagram illustrating the configuration of the passenger counting system according to the present exemplary embodiment. The passenger counting system includes a photographing unit 10 and a passenger counting device 300. In addition, the passenger counting device 300 includes a movement amount calculation unit 31, a depth distance calculation unit 12, and a passenger number determination unit 13. The movement amount calculation unit 31 includes a movement amount estimation unit 32 and an error calculation unit 33.

The photographing unit 10 photographs a vehicle and acquires an image. In the present exemplary embodiment, the photographing unit 10 is a general camera, and photographs a subject to generate a digital image.

The movement amount calculation unit 31 calculates the movement amount of the vehicle based on the image of the vehicle acquired by the photographing unit 10. Specifically, the movement amount estimation unit 32 first estimates the movement amount of the vehicle based on the movement amount of a specific part of the vehicle such as a handle portion of a door.

Then, the error calculation unit 33 measures a distance from a first position to a second position of a face of a specific person for each timing based on images of the vehicle at a plurality of timings. Here, photographing can be performed at periodic timings, or photographing can be performed at variable timings in regard to the timing. For example, it is also possible to detect speed of the vehicle and make the timing variable on the basis of the speed of the vehicle. Then, the error calculation unit 33 estimates an error of the movement amount of the vehicle when an objective function becomes an extreme value using a steepest descent method by setting a function including a difference between a distance from the first position to the second position at a first timing and a distance from the first position to the second position at a second timing as the objective function. Here, the first position and the second position may be characteristic points such as a nose, an inner corner of an eye, an outer corner of an eye, and a mouth constituting the face. Further, the distance from the first position to the second position may be a distance between arbitrary two points among the characteristic points such as the nose, the inner corner of the eye, the outer corner of the eye, and the mouth constituting the face. Further, a relationship between the first timing and the second timing needs to be the timing at which the specific person is reflected in the images obtained at both the timings. In addition, the movement amount is calculated using the plurality of images in the present exemplary embodiment, but is not particularly limited. Specifically, it is also possible to adopt a technique of acquiring the movement amount using only one image. For example, it is possible to calculate the movement amount using an afterimage (motion blur) in one image.

The depth distance calculation unit 12 calculates a distance (depth distance) in a depth direction of the face of the passenger of the vehicle in real space based on the movement amount of the vehicle calculated by the movement amount calculation unit 31. Specifically, the depth distance calculation unit 12 calculates the distance in the depth direction from the photographing unit 10 to the face of the passenger based on the calculated movement amount of the vehicle and a direction toward the face of the passenger of the vehicle from a position of the photographing unit 10 that has photographed the vehicle.

The passenger number determination unit 13 detects the face of the passenger of the vehicle from the image of the vehicle acquired by the photographing unit 10, determines presence or absence of erroneous detection based on a distance in the depth direction between a plurality of detected faces of passengers, and determines the number of passengers of the vehicle. For example, when the distance in the depth direction between the plurality of detected faces of passengers is equal to or longer than a first threshold value or when a distance in the traveling direction between the plurality of faces of passengers is equal to or longer than a second threshold value, the passenger number determination unit 13 determines that the plurality of faces of passengers are faces of different persons. The passenger number determination unit 13 may use a distance between partial images from which the face is detected as the distance between the faces.

Figure 8:
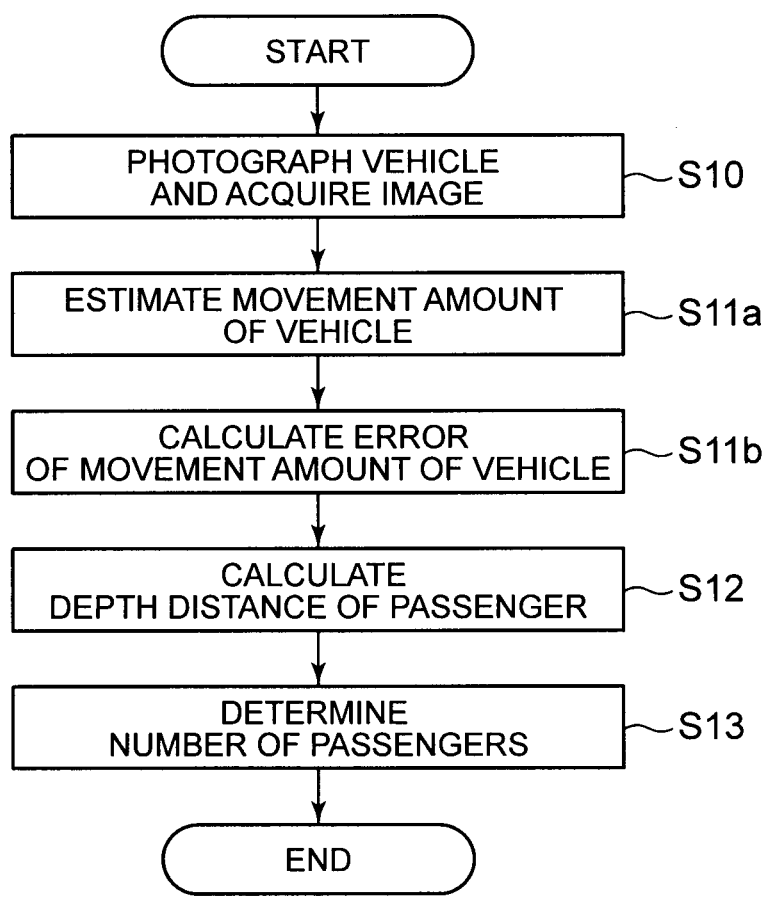
FIG. 8 It depicts a flowchart illustrating an operation of the second exemplary embodiment of the passenger counting system according to the present invention.

Next, an operation of the passenger counting system according to the present exemplary embodiment will be described. FIG. 8 is a flowchart illustrating the operation of the passenger counting system according to the present exemplary embodiment.

The photographing unit 10 photographs a moving vehicle at a plurality of timings and acquires images (step S10).

The movement amount estimation unit 32 estimates the movement amount of the vehicle based on the image of the moving vehicle (step S11a). The movement amount estimation unit 32 first detects a specific part of the vehicle such as a door handle portion (a door knob or a door outer handle) from the image acquired by the photographing unit 10, and acquires information such as a coordinate value indicating a position of the detected specific part. Then, the movement amount estimation unit 32 sets a distance of the door handle portion between time t and time t+1 to an estimated movement amount $L_{t, t+1}$ of the vehicle. However, the movement amount on the image differs depending on the depth distance, and thus, there is a possibility that an error may occur in the case of calculating a depth distance of a passenger to be described later using the estimated movement amount $L_{t, t+1}$ calculated based on the movement amount of the door handle portion. Incidentally, an operation of the movement amount estimation unit 32 according to the present exemplary embodiment is the same as the operation of the movement amount calculation unit 11 according to the first exemplary embodiment, and thus, a detailed description thereof will be omitted.

The error calculation unit 33 estimates the error of the movement amount of the vehicle using the steepest descent method (step S11b). Hereinafter, a method of estimating the error of the movement amount calculated by the error calculation unit 33 will be described. A vehicle movement amount $l_{t, t+1}$ in consideration of the error is expressed by the following Formula (3). Here, ΔL is a predetermined parameter, and x is an estimation parameter indicating an error of a movement amount of a vehicle. In order to calculate the vehicle movement amount, it is necessary to estimate this error x.

[Formula 3]

$$l_{t,t+1} = L_{t,t+1}\left[1 + \Delta L\left\{\frac{2}{1+\exp(-x)} - 1\right\}\right] \quad (3)$$

Figure 9:
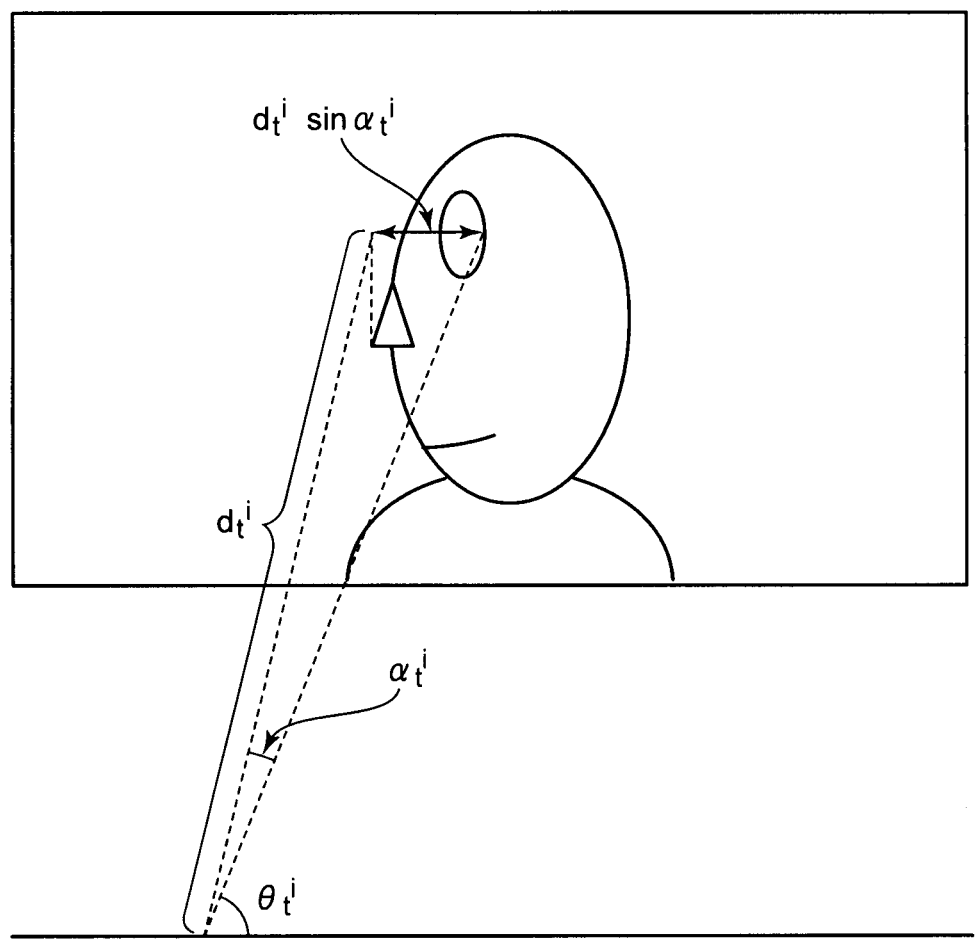
FIG. 9 It depicts an enlarged view of a face of a passenger of a vehicle.

FIG. 9 is an enlarged view of a face of a passenger of a vehicle. As illustrated in FIG. 9, a distance from an observation point (a position of the photographing unit 10 in the present exemplary embodiment) to the face of the specific person riding in the vehicle at time t is denoted by $d_t^i$, the distance from the first position to the second position of the face of the specific person is expressed as $d_t^i \sin \alpha_t^i$. In the example illustrated in FIG. 9, the above-described distance from the first position to the second position is a distance from the outer corner of the eye to a distal end of the nose on a profile of the face, but may be another distance as long as it is a distance between predetermined parts of the same person. The error calculation unit 33 calculates the above-described distance from the first position to the second position of the specific person in each of an image frame t and an image frame t+1.

A function $\varphi_{t, t+1}^{i,j}$, which includes a difference between the distance $d_t^i \sin \alpha_t^i$ from the first position to the second position of the specific person in the image frame t and a distance $d_{t+1}^j \sin \alpha_{t+1}^j$ from the first position to the second position of the specific person in the image frame t+1, is expressed by the following Formula (4). Here, i is a variable to specify the face detected in the image frame t, and j is a variable to specify the face detected in the image frame t+1.

[Formula 4]

$$\varphi_{t,t+1}^{i,j} = \|d_t^i \sin \alpha_t^i - d_{t+1}^j \sin \alpha_{t+1}^j\|^2 \quad (4)$$

In addition, an objective function E configured to estimate the error x is expressed by Formula (5). In Formula (5), σ is a predetermined parameter. Further, $G_{j \in t, t+1}^i$ is a detection result set on the image frame t+1 which is a pair candidate with an i-th detection result of the image frame t.

[Formula 5]

$$E = \sum_i \sum_{j = G_{j \in t, t+1}^i} \exp\left(-\frac{\varphi_{t,t+1}^{i,j}}{\sigma^2}\right) \quad (5)$$

In the image frame t and the image frame t+1, the distance from the first position to the second position is the same as long as the person is the same, and the function $\varphi_{t, t+1}^{i,j}$ becomes the minimum. In addition, E is a Gaussian function, and an extreme value of E is a value that minimizes $\varphi_{t, t+1}^{i,j}$. Since the movement amount that needs to be calculated is the movement amount of the same person, it is possible to estimate that a value of x at which E becomes the extreme value is an actual error. In the present exemplary embodiment, the error calculation unit 33 uses the steepest descent method in order to calculate the extreme value of E.

A method of estimating x using the steepest descent method will be described. In Formula (6), ρ is a parameter to determine a weight of a numerical value to be updated once. Further, s indicates the number of repetitions. The error calculation unit 33 estimates the error x when the objective function E becomes the extreme value by repeatedly performing the calculation of Formula (6). Specifically, the error calculation unit 33 sets a predetermined initial value to x(s) at first, and calculates the next x(s+1) using x(s+1) thus calculated as the next x(s). The error calculation unit 33 repeats the process of calculating x(s+1), and sets x(s+1) obtained when ∂E/∂x becomes zero or becomes a value smaller than a predetermined value as a solution of the error x. The movement amount calculation unit 31 can calculate the vehicle movement amount $l_{t,\,t+1}$ in consideration of the error by substituting the calculated error x into Formula (3).

[Formula 6]

$$x(s+1) = x(s) - \rho \frac{\partial E}{\partial x}\bigg|_{x=x(s)} \quad (6)$$

The error calculation unit 33 may estimate the error x using another method, for example, the Newton method, the EM algorithm, or the like and calculate the vehicle movement amount $l_{t,\,t+1}$ in consideration of the error.

The depth distance calculation unit 12 calculates the depth distance of the face of the passenger of the vehicle based on the movement amount of the vehicle calculated by the movement amount calculation unit 31 (step S12). In order to calculate the depth, the depth distance calculation unit 12 measures a direction of a face of a target person relative to the camera (photographing unit 10). The depth distance calculation unit 12 uses, for example, a pinhole camera model in order to measure the direction.

The passenger number determination unit 13 acquires the face of the passenger detected from the image, and determines the presence or absence of erroneous detection based on the distance in the depth direction of a plurality of detected faces of passengers, and determines the number of passengers of the vehicle (step S13).

Incidentally, a configuration example of the computer of the passenger counting system according to the present exemplary embodiment is the same as that of the passenger counting system according to the first exemplary embodiment (see FIG. 6).

As described above, the passenger counting system according to the present exemplary embodiment estimates the error of the movement amount of the vehicle using the steepest descent method, and thus, it is possible to acquire the movement amount in consideration of the error and the depth information.

Third Exemplary Embodiment

Figure 10:
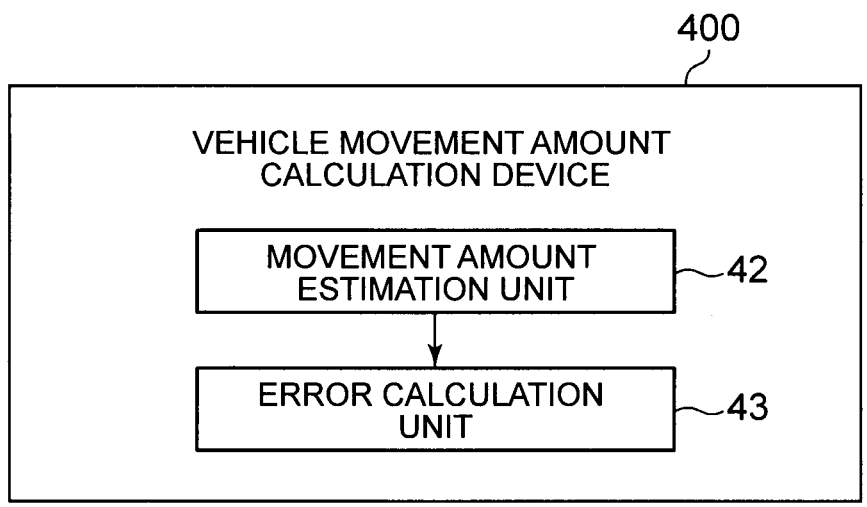
FIG. 10 It depicts a block diagram illustrating a configuration of a third exemplary embodiment of the passenger counting system according to the present invention.

A vehicle movement amount calculation device according to the present exemplary embodiment will be described with reference to the drawings. A function of a vehicle movement amount calculation device 400 according to the present exemplary embodiment is the same as that of the movement amount calculation unit 31 according to the second exemplary embodiment, and thus, a detailed description thereof will be omitted. FIG. 10 is a block diagram illustrating a configuration of the vehicle movement amount calculation device 400 according to the present exemplary embodiment.

The vehicle movement amount calculation device 400 includes a movement amount estimation unit 42 and an error calculation unit 43.

The movement amount estimation unit 42 acquires an image of a vehicle and estimates a movement amount of the vehicle based on the acquired image of the vehicle. Specifically, the movement amount estimation unit 42 estimates the movement amount of the vehicle based on the movement amount of a specific part of the vehicle such as a handle portion of a door.

The error calculation unit 43 estimates an error of the movement amount of the vehicle when an objective function becomes an extreme value using a steepest descent method by setting a function including a difference between a distance from a first position to a second position at a first timing and a distance from the first position to the second position at a second timing as the objective function.

The vehicle movement amount calculation device 400 corrects the movement amount estimated by the movement amount estimation unit 42 using the error calculated by the error calculation unit 43, thereby calculating the movement amount of the vehicle in consideration of the error.

Figure 11:
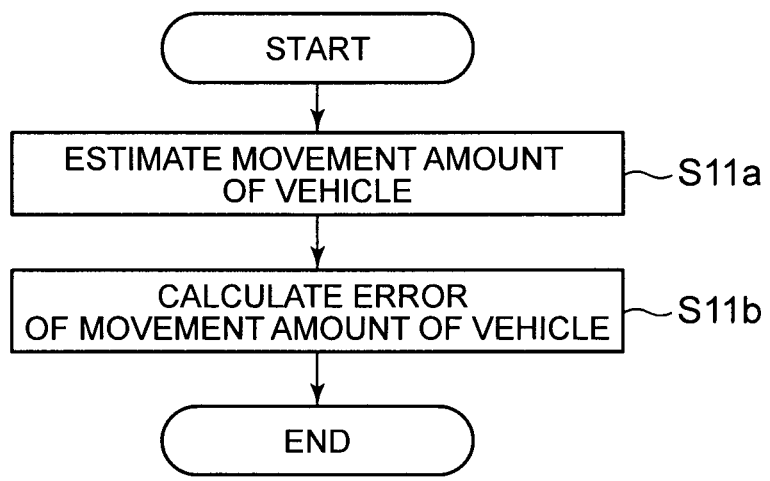
FIG. 11 It depicts a flowchart illustrating an operation of the third exemplary embodiment of the passenger counting system according to the present invention.

Next, an operation of the vehicle movement amount calculation device according to the present exemplary embodiment will be described. FIG. 11 is a flowchart illustrating the operation of the vehicle movement amount calculation device according to the present exemplary embodiment.

The movement amount estimation unit 42 estimates the movement amount of the vehicle based on the image of the moving vehicle (step S11a). The movement amount estimation unit 42 first detects a specific part of the vehicle such as a door handle portion (a door knob or a door outer handle) from the acquired image, and acquires information such as a coordinate value indicating a position of the detected specific part. The specific part of the vehicle may be any portion, such as a tire, a window frame, a vehicle door, a tail lamp, a door mirror, and a side mirror, other than the door handle portion as long as the portion has a characteristic as the specific part of the vehicle.

The error calculation unit 43 estimates the error of the movement amount of the vehicle using the steepest descent method (step S11b). The error calculation unit 43 estimates an error of the movement amount of the vehicle when an objective function becomes an extreme value using a steepest descent method by setting a function including a difference between a distance from a first position to a second position at a first timing and a distance from the first position to the second position at a second timing as the objective function.

Incidentally, a configuration of a computer of the vehicle movement amount calculation device according to the present exemplary embodiment is the same as that of the passenger counting system according to the first exemplary embodiment (see FIG. 6).

As described above, the vehicle movement amount calculation device according to the present exemplary embodiment estimates the error of the movement amount of the vehicle using the steepest descent method, and thus, it is possible to calculate the movement amount in consideration of the error. In addition, it is possible to accurately count the number of passengers of the vehicle when the movement amount of the vehicle is used to count the number of passengers of the vehicle.

Figure 12:
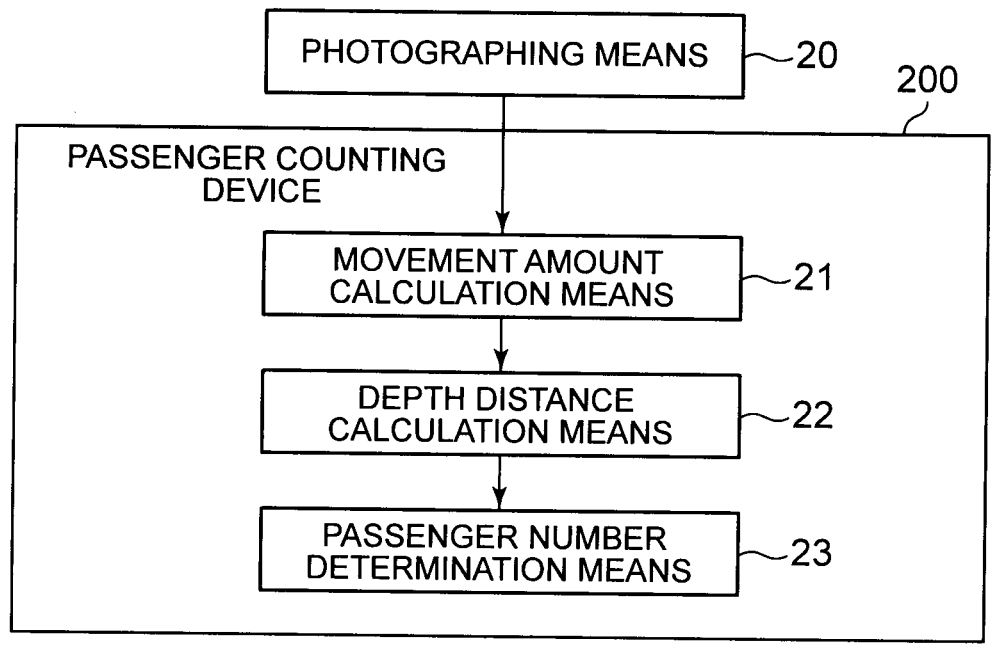
FIG. 12 It depicts a block diagram illustrating a configuration of a main part of the passenger counting system according to the present invention.

FIG. 12 is a block diagram illustrating a configuration of a main part of the passenger counting system according to the present invention. The passenger counting system includes a photographing means 20 for photographing a vehicle and acquiring an image, and a passenger counting device 200. The passenger counting 200 includes: a movement amount calculation means 21 for calculating a movement amount of a vehicle based on an image of the vehicle; a depth distance calculation means 22 for calculating a distance in a depth direction of a face of a passenger of the vehicle based on the movement amount of the vehicle; and a passenger number determination means 23 for detecting the face of the passenger of the vehicle from the image and determining the number of passengers of the vehicle based on distances in the depth direction of a plurality of detected faces of the passengers.

In addition, the passenger counting system illustrated in the following (1) to (6) is also disclosed in the above-described exemplary embodiments.

(1) The passenger counting system may be configured such that the passenger number determination means (for example, the passenger number determination unit 13) determines presence or absence of erroneous detection based on the distance in the depth direction between the plurality of detected faces of passengers.

(2) The passenger counting system may be configured such that the movement amount calculation means (for example, the movement amount calculation unit 31) estimates the error of the movement amount of the vehicle using the steepest descent method.

(3) The passenger counting system may be configured such that the movement amount calculation means (for example, the movement amount calculation unit 31) measures the distance from the first position to the second position of the face of the specific person for each timing based on the images of the vehicle at the plurality of timings, and estimates the error of the movement amount of the vehicle when the objective function becomes the extreme value using the steepest descent method by setting the function including the difference between the distance at the first timing and the distance at the second timing as the objective function.

(4) The passenger counting system may be configured such that the passenger number determination means (for example, the passenger number determination unit 13) determines that the plurality of faces of passengers are the faces of different persons when the distance in the depth direction between the plurality of detected faces of passengers is equal to or longer than the first threshold value. According to such a passenger counting system, it is possible to more accurately count the number of passengers.

(5) The passenger counting system may be configured such that the passenger number determination means (for example, the passenger number determination unit 13) determines that the plurality of faces of passengers are the faces of different persons when the distance in the depth direction between the plurality of detected faces of passengers is equal to or longer than the first threshold value or when the distance in the traveling direction between the plurality of faces of passengers is equal to or longer than the second threshold value.

(6) The passenger counting system may be configured such that the depth distance calculation means (for example, the depth distance calculating section 12) calculates the distance in the depth direction from a photographing means to the face of the passenger based on the calculated movement amount of the vehicle and the direction toward the face of the passenger of the vehicle from the position of the photographing means (for example, the photographing unit 10) that has photographed the vehicle.

As above, the invention of the present application has been described with reference to the exemplary embodiments, but the invention of the present application is not limited to the above-described exemplary embodiments. Various modifications that can be understood by the person skilled in the art can be made within a scope of the invention of the present application regarding the configuration and the details of the invention of the present application.

REFERENCE SIGNS LIST

10 Photographing unit
11, 31 Movement amount calculation unit
12 Depth distance calculation unit
13 Passenger number determination unit
20 Photographing means
21 Movement amount calculation means
22 Depth distance calculation means
23 Passenger number determination means
32, 42 Movement amount estimation unit
33, 43 Error calculation unit
100, 200 Passenger number counting device

The invention claimed is:

1. A passenger counting device comprising:
a movement amount calculation unit, implemented by a processor, for calculating a movement amount of a vehicle based on an image of the vehicle;
a depth distance calculation unit, implemented by the processor, for calculating a distance in a depth direction of a face of a passenger of the vehicle based on the movement amount of the vehicle; and
a passenger number determination unit, implemented by the processor, for detecting the face of the passenger of the vehicle from the image and determining a number of passengers of the vehicle based on distances in the depth direction of a plurality of detected faces of passengers.

2. The passenger counting device according to claim 1, wherein
the passenger number determination unit determines presence or absence of erroneous detection based on a distance in the depth direction between a plurality of detected faces of passengers.

3. The passenger counting device according to claim 1, wherein
the movement amount calculation unit estimates an error of the movement amount of the vehicle using a steepest descent method.

4. The passenger counting device according to claim 3, wherein
the movement amount calculation unit measures a distance from a first position to a second position of a face of a specific person for each timing based on images of the vehicle at a plurality of timings and estimates the error of the movement amount of the vehicle when an objective function becomes an extreme value using the steepest descent method by setting a function including a difference between the distance at a first timing and the distance at a second timing as the objective function.

5. The passenger counting device according to claim 1, wherein
the passenger number determination unit determines that a plurality of faces of passengers are faces of different persons when a distance in the depth direction between the plurality of detected faces of passengers is equal to or longer than a first threshold value.

6. The passenger counting device according to claim 1, wherein
the passenger number determination unit determines that a plurality of faces of passengers are faces of different persons when a distance in the depth direction between the plurality of detected faces of passengers is equal to or longer than a first threshold value or when a distance in a traveling direction between the plurality of faces of passengers is equal to or longer than a second threshold value.

7. The passenger counting device according to claim 1, wherein
the depth distance calculation unit calculates a distance in the depth direction from a photographing unit to the face of the passenger based on the calculated movement amount of the vehicle and a direction toward the face of the passenger of the vehicle from a position of the photographing unit that has photographed the vehicle.

8. A passenger counting method comprising:
calculating a movement amount of a vehicle based on an image of the vehicle;
calculating a distance in a depth direction of a face of a passenger of the vehicle based on the movement amount of the vehicle; and
detecting the face of the passenger of the vehicle from the image and determining a number of passengers of the vehicle based on distances in the depth direction of a plurality of detected faces of passengers.

9. The passenger counting method according to claim 8, wherein
presence or absence of erroneous detection is determined based on a distance in the depth direction between a plurality of detected faces of passengers.

10. The passenger counting method according to claim 8, wherein
an error of the movement amount of the vehicle is estimated using a steepest descent method.

11. The passenger counting method according to claim 10, wherein
a distance from a first position to a second position of a face of a specific person is measured for each timing based on images of the vehicle at a plurality of timings, and the error of the movement amount of the vehicle when an objective function becomes an extreme value is estimated using the steepest descent method by setting a function including a difference between the distance at a first timing and the distance at a second timing as the objective function.

12. The passenger counting method according to claim 8, wherein
when a distance in the depth direction between a plurality of detected faces of passengers is equal to or longer than a first threshold value, it is determined that the plurality of faces of passengers are faces of different persons.

13. The passenger counting method according to claim 8, wherein
when a distance in the depth direction between a plurality of detected faces of passengers is equal to or longer than a first threshold value or when a distance in a traveling direction between the plurality of faces of passengers is equal to or longer than a second threshold value, it is determined that the plurality of faces of passengers are faces of different persons.

14. The passenger counting method according to claim 8, wherein
a distance in the depth direction from a photographing unit to the face of the passenger is calculated based on the calculated movement amount of the vehicle and a direction toward the face of the passenger of the vehicle from a position of the photographing unit that has photographed the vehicle.

15. A non-transitory computer-readable recording medium recording a passenger counting program configured to cause a computer to execute:
a movement amount calculation process of calculating a movement amount of a vehicle based on an image of the vehicle;
a depth distance calculation process of calculating a distance in a depth direction of a face of a passenger of the vehicle based on the movement amount of the vehicle; and
a passenger number determination process of detecting the face of the passenger of the vehicle from the image and determining a number of passengers of the vehicle based on distances in the depth direction of a plurality of detected faces of passengers.

16. The non-transitory computer-readable recording medium according to claim 15, wherein
the passenger counting program causes the computer to determine presence or absence of erroneous detection based on a distance in the depth direction between a plurality of detected faces of passengers in the passenger number determination process.

17. The non-transitory computer-readable recording medium according to claim 15, wherein
the passenger counting program causes the computer to estimate an error of the movement amount of the vehicle using a steepest descent method in the movement amount calculation process.

18. The non-transitory computer-readable recording medium according to claim 17, wherein
the passenger counting program causes the computer to measure a distance from a first position to a second position of a face of a specific person for each timing based on images of the vehicle at a plurality of timings, and to estimate the error of the movement amount of the vehicle when an objective function becomes an extreme value using the steepest descent method by setting a function including a difference between the distance at a first timing and the distance at a second timing as the objective function in the movement amount calculation process.

19. The non-transitory computer-readable recording medium according to claim 15, wherein
the passenger counting program causes the computer to determine that a plurality of faces of passengers are faces of different persons when a distance in the depth direction between the plurality of detected faces of passengers is equal to or longer than a first threshold value in the passenger number determination process.

20. The non-transitory computer-readable recording medium according to claim 15, wherein
the passenger counting program causes the computer to determine that a plurality of faces of passengers are faces of different persons when a distance in the depth direction between the plurality of detected faces of passengers is equal to or longer than a first threshold value or when a distance in a traveling direction between the plurality of faces of passengers is equal to or longer than a second threshold value in the passenger number determination process.

\* \* \* \* \*

UNITED STATES PATENT AND TRADEMARK OFFICE
CERTIFICATE OF CORRECTION

PATENT NO. : 10,318,829 B2
APPLICATION NO. : 15/572826
DATED : June 11, 2019
INVENTOR(S) : Shinichi Miyamoto It is certified that error appears in the above-identified patent and that said Letters Patent is hereby corrected as shown below:

In the Claims

Column 14, Line 54; In Claim 4, after "timings", insert --,--

Signed and Sealed this
Seventeenth Day of September, 2019

Andrei Iancu
*Director of the United States Patent and Trademark Office*